United States Patent [19]

Stöhr

[11] Patent Number: 4,860,917
[45] Date of Patent: Aug. 29, 1989

[54] SCRAPING ARRANGEMENT FOR TELESCOPIC COVERS

[75] Inventor: Albert Stöhr, Markt Schwaben, Fed. Rep. of Germany

[73] Assignee: Gebr. Hennig GmbH, Fed. Rep. of Germany

[21] Appl. No.: 190,536

[22] Filed: May 5, 1988

[30] Foreign Application Priority Data

May 13, 1987 [WO] PCT Int'l Appl. .................. PCT/EP87/00250
Jul. 7, 1987 [DE] Fed. Rep. of Germany ....... 3722450

[51] Int. Cl.⁴ ............................................. B23Q 11/08
[52] U.S. Cl. ......................................... 220/8; 74/608; 384/15
[58] Field of Search ............... 74/608, 609; 150/52 R; 220/8; 384/15, 16

[56] References Cited

U.S. PATENT DOCUMENTS

| | | | |
|---|---|---|---|
| 2,990,970 | 7/1961 | Murdock | 220/8 |
| 3,603,651 | 9/1971 | Weber | 384/16 |
| 3,751,120 | 8/1973 | Kietz | 384/15 |
| 3,785,418 | 1/1974 | Hennig | 150/52 R |
| 4,522,246 | 6/1985 | Bierbrauder | 384/15 X |
| 4,722,452 | 2/1988 | Hennig | 220/8 |
| 4,771,906 | 9/1988 | Hennig | 220/8 |
| 4,773,457 | 9/1988 | Bierbrauer | 150/52 R |

FOREIGN PATENT DOCUMENTS 1803448  5/1970  Fed. Rep. of Germany .

Primary Examiner—Robert G. Nilson
Attorney, Agent, or Firm—Thomas & Kennedy

[57] ABSTRACT

The invention relates to a scraping arrangement for a telescopic cover, in which a buffer which is made from a different material from that of the scraper is arranged on the rear face of the scraping arrangement. With such a construction the choice of material for the individual elements can be thoroughly optimized.

9 Claims, 3 Drawing Sheets

SCRAPING ARRANGEMENT FOR TELESCOPIC COVERS

The invention relates to a scraping arrangement for telescopic covers, and, more particularly, to a scraping arrangement for telescopic covers which comprise a plurality of steel, or other metal, cover boxes.

Scraping arrangements of this type are already known from DE-AS No. 1 803 448, DE-GM No. 81 07 714 and DE-GM No. 86 13 005 in the name of the present applicant. Telescoping cover arrangements are shown in U.S. patent application Ser. No. 029,446 of Bierbrauer.

Figure 3:
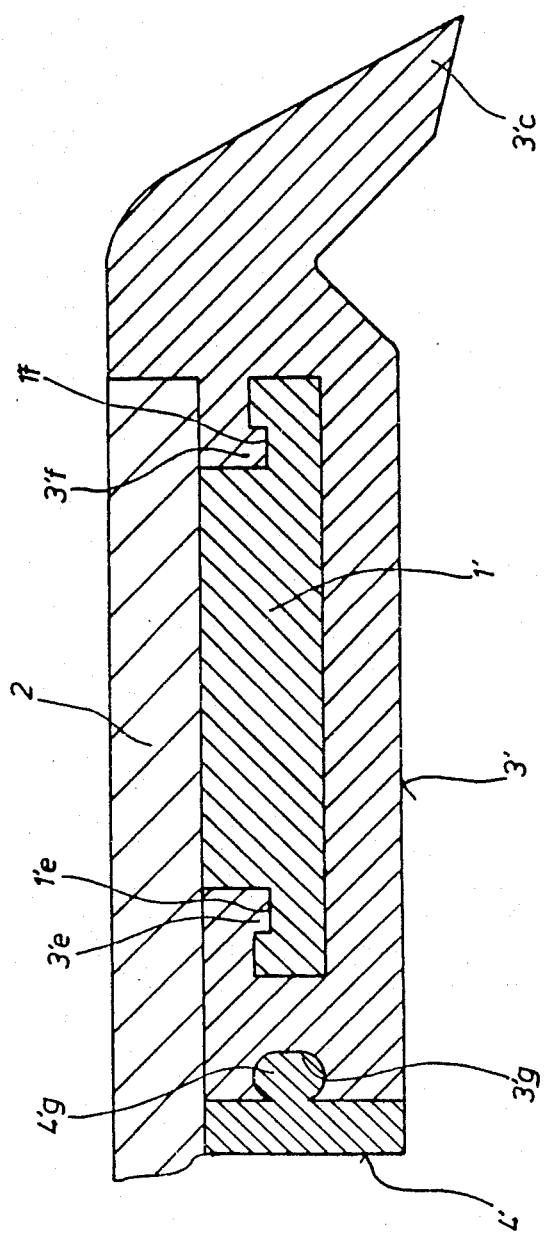
Figure 4:
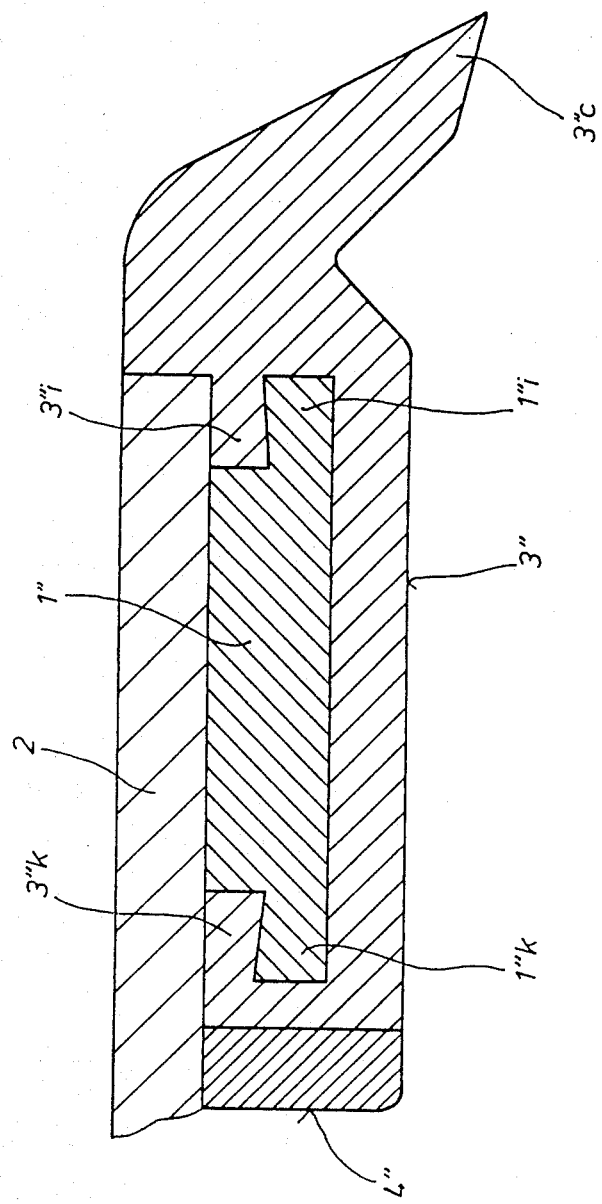

In the constructions according to FIGS. 3 to 5 of DE-AS No. 1 803 448 and in the scraping arrangement according to DE-GM No. 13 005 the scraper which is made from flexible material engages around the carrier strip and the front and rear sides thereof so that when the telescopic cover is drawn apart the next smaller cover box in each case rests on the rear end face of the scraper.

The object of the invention is to construct a scraping arrangement for a telescopic cover comprising a plurality of cover boxes in such a way that the choice of material for the individual elements of the scraping arrangement can be optimised still further.

This object is achieved according to the invention by a buffer member arranged on the rear face of the scraping arrangement and made from a different material than that of the scraper.

Advantageous embodiments of the invention are the subject matter of the subordinate claims.

According to the invention a buffer which is made from a different material from the scraper is arranged on the rear of the scraping arrangement. Thus according to the invention materials are used for the scraper and the buffer which are optimally adapted to the special function of each of these elements. Whereas in the case of the scraper it is a question in particular of a high resistance to abrasion (with limited elastic deformability), the buffer must be made from a material which is very deformable under compression stress and accepts a high degree of deformation, thus having a strong damping effect. By the choice according to the invention of different materials for the scraper and the buffer, the functioning of both elements is improved and the operational life of the scraping arrangement is lengthened considerably.

Figure 1:
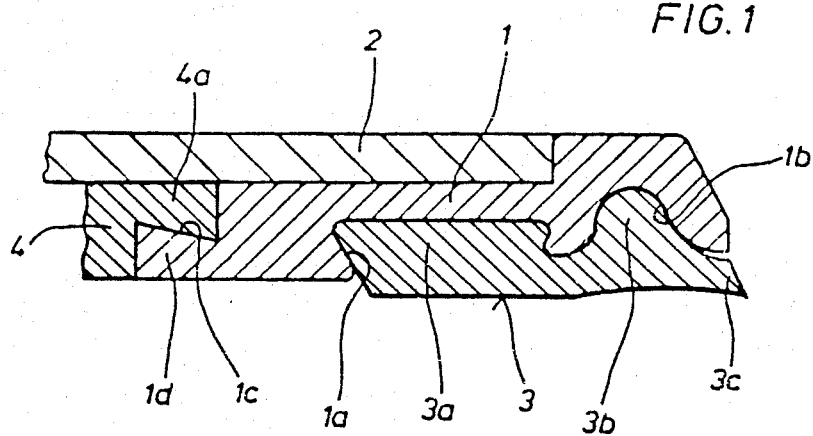
Figure 2:
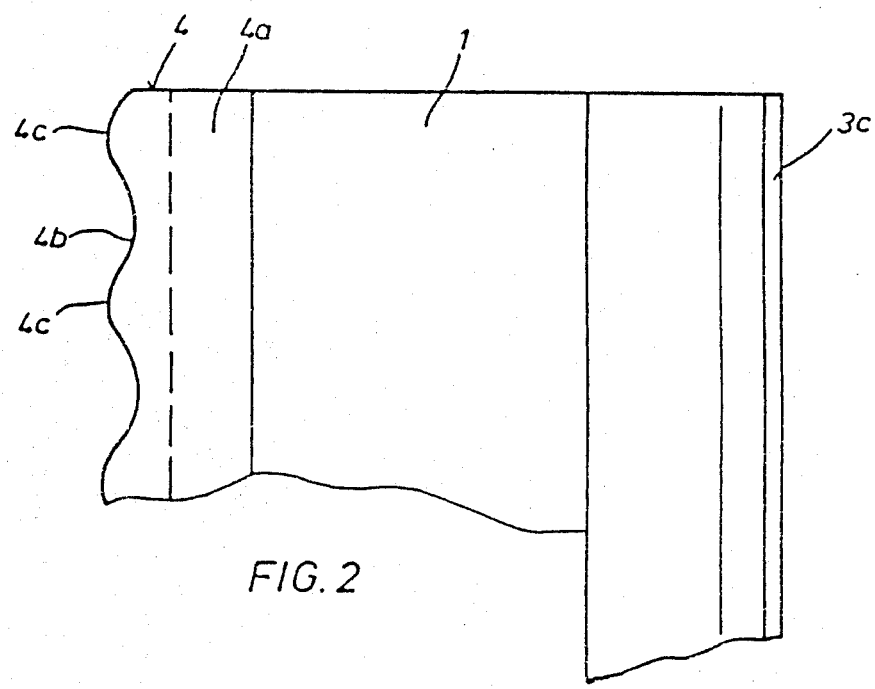

Some embodiments of the invention are illustrated in the drawings, in which:

FIG. 1 shows a section through a first embodiment of the scraping arrangement according to the invention, FIG. 2 shows a plan view of the scraping arrangement according to FIG. 1, FIGS. 3 and 4 show sections through the further variants of the invention.

The scraping arrangement shown in FIGS. 1 and 2 for a telescopic steel cover consisting of a plurality of cover boxes contains a carrier strip 1 made from rigid material and connected to the top wall 2 of a cover box in a suitable manner (for example by means of a screw, rivet or weld connection).

The scraping arrangement also contains a scraper 3 made from flexible material which is connected in a form-locking and releasable manner to the underside of the carrier strip 1. For this purpose the carrier strip 1 contains a recess 1a of approximately dovetailed crossection in which the scraper 3 engages with an appropriately profiled projection 3a.

The carrier strip 1 is also provided in its front region with a recess 1b which serves to receive and support a projection 3b of the scraper 3. The scraper 3 opens in its front region in a scraping lip 3c.

A buffer 4 which is made from a different material from that of the scraper 3 and in the embodiment according to FIGS. 1 and 2 is releasable from the carrier strip 1 independently of the scraper 3 is arranged on the rear face of the scraping arrangement.

The buffer 4 is provided on the side facing the carrier strip 1 with a projection 4a which engages form-lockingly in a recess 1c in the carrier strip 1, and and an interlocking engagement is produced between the projection 4a of the buffer and the rear part 1d of the carrier strip 1 forming the recess 1c by means of which the buffer 4 is held reliably on the carrier strip 1 during operation.

However, the form-locking connection between the buffer 4 and the carrier strip 1 can be released if necessary, for example by displacement of the buffer 4 in the longitudinal direction.

On its rear end face 4b, which comes to a stop with the next smaller cover box, the buffer 4 is provided with projections 4c which in the illustrated embodiment are in wave form. However, it is also possible to construct the projections 4c in a different way, for example in rib or cone form.

In the embodiment illustrated in FIG. 3 the scraping arrangement mounted on the top wall 2 of the cover box consists of a carrier strip 1', a scraper 3' and a buffer 4'.

In this embodiment the scraper 3' engages around the carrier strip 1', which is of T-shaped cross-section, on the front, underside and rear and is connected form-lockingly to the carrier strip 1' by means of complementarily constructed projections 3'e, 3'f and corresponding recesses 1'e, 1'f.

The buffer 4' is provided on the side facing the carrier strip 1' with a projection 4'g which preferably engages so as to interlock in a complementary recess 3'g in the scraper 3'. In this way the buffer 4' is releasably connected to the scraper 3'. Thus in this embodiment too the material for the buffer 4' can be chosen independently of the material for the scraper 3', so that optimum adaptation of the materials to the different functions of the scraper 3' and the buffer 4' can be achieved.

It goes without saying that in the embodiment according to FIG. 3 the most varied possibilities exist for the construction of the rear end face of the buffer 4' which comes to a stop, as has already been mentioned in relation to FIGS. 1 and 2.

FIG. 4 shows an embodiment in which the scraping arrangement connected to the top wall 2 contains a carrier strip 1", a scraper 3" and a buffer 4". The carrier strip 1" and the scraper 3" are connected to one another in a form-locking and releasable manner, as in the embodiment according to FIG. 3, by means of projections 1"i, 1"k and 3"i, 3"k which engage behind one another.

In this embodiment the buffer 4" is firmly connected to the scraper 3", preferably by common extrusion of the scraper 3" and the buffer 4" (but from different materials).

The buffer 4" can be produced for example from elastic expanded plastics material, i.e. from a material which has a high internal deformability and accordingly provides a good shock and sound absorption in the buffer operation. By contrast a material is chosen for the scraper 3" which leads to the least possible friction on the scraping lip 3"c (whilst at the same time retaining a good scraping function).

It should be understood that a preferred embodiment of the invention has been disclosed; and various modifications, deletions and additions thereto can be made without departing from the spirit and scope of the invention as set forth in the following claims.

I claim:

1. Scraping arrangement for a telescopic cover consisting of a plurality of cover boxes, especially for a telescopic steel cover, containing
   (a) a carrier strip (1, 1', 1") which is made from rigid material and can be connected to the top wall (2) of a cover box,
   (b) and a scraper (3, 3', 3") which is made from flexible material and is connected in a form-locking and releasable manner to the underside of the carrier strip.
   characterised in that
   (c) a buffer (4, 4', 4") which is made from a different material from that of the scraper is arranged on the rear face of the scraping arrangement.

2. Scraping arrangement as claimed in claim 1, characterised in that the buffer (4, 4') is releasable from the carrier strip (1, 1') independently of the scraper (3, 3').

3. Scraping arrangement as claimed in claim 2, characterised in that the buffer (4) is releasably connected by an elastic form-locking connection to the carrier strip (1).

4. Scraping arrangement as claimed in claim 1, characterised in that the buffer (4") is connected to the scraper (3") and releasable from the carrier strip (1") together with the the scraper.

5. Scraping arrangement as claimed in claim 4, characterised in that the buffer (4") is firmly connected to the scraper (3").

6. Scraping arrangement as claimed in claim 5, characterised in that the buffer (4") which is produced from elastic expanded plastics material is extruded together with the scraper (3").

7. Scraping arrangement as claimed in claim 1, characterised in that the buffer (4') is releasably connected by an elastic form-locking connection to the scraper (3').

8. Scraping arrangement as claimed in claim 1, characterised in that the buffer (4, 4', 4") has on its rear end face which comes to a stop with the next smaller cover box projections (4c) which are preferably constructed in wave, rib or cone form.

9. For use in a telescopic cover comprising a plurality of telescopically movable cover boxes, a scraping assembly for mounting to an edge of an outer wall (2) of a larger cover box for sliding engagement with the next smaller cover box comprising a carrier strip (1) including first and second opposed sides with the first side mounted to the wall (2) of the outer cover box, a flexible scraper strip (3) including a scraper edge and a face remote from said scraper edge, said flexible scraper strip being releasably mounted to the second side of said carrier strip, and a buffer strip (4) mounted in abutment with the outer wall (2) of the larger cover box at a position displaced from the edge of the cover box adjacent the remote face of said scraper strip, said buffer strip being of a material that is more readily deformable under stress than the material of said scraper strip.

* * * * *